Figure 1:
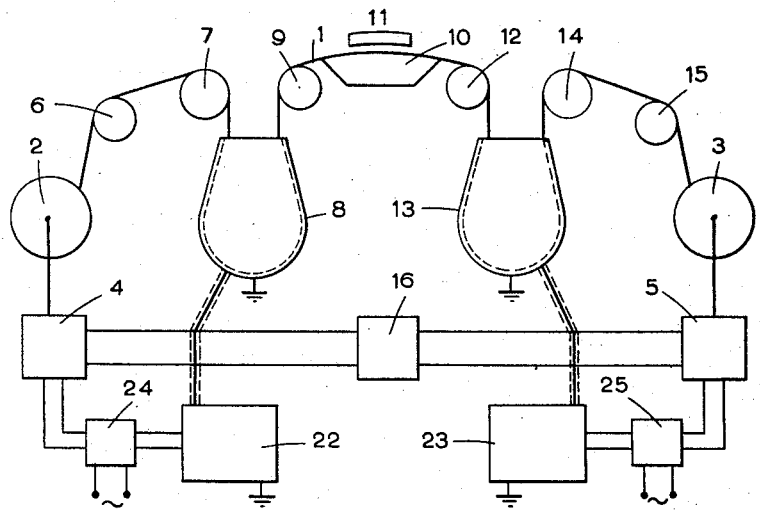

Oct. 23, 1962   P. M. HALL ETAL   3,059,870
APPARATUS FOR SENSING THE QUANTITY OF AN ELONGATED MEDIUM
Filed Sept. 11, 1959

Inventors
P. M. Hall
J. J. H. Bamford
Attys.

United States Patent Office 3,059,870
Patented Oct. 23, 1962

3,059,870
APPARATUS FOR SENSING THE QUANTITY OF AN ELONGATED MEDIUM
Philip Merrick Hall, Radstock, near Bath, and John Joseph Henry Bamford, Kingswood, Bristol, England, assignors to Electric & Musical Industries Limited, Hayes, Middlesex, England, a company of Great Britain
Filed Sept. 11, 1959, Ser. No. 839,319
Claims priority, application Great Britain Sept. 18, 1958
6 Claims. (Cl. 242—55.12)

This invention relates to apparatus for sensing the quantity of an elongated medium.

In magnetic data storage apparatus such as that employed in so-called business machines an elongated medium in the form of magnetisable tape is used and usually in such apparatus the magnetic tape is wound upon spools and is fed into storage containers or bins which maintain a supply of tape for feeding past a magnetic transducing head or heads. When, in such apparatus the tape in one of the storage containers exceeds a predetermined quantity, the tape is withdrawn from said container and wound upon the spool, and likewise when the tape in one of the containers reaches a predetermined minimum, tape from one of the spools is fed thereto to replenish the supply. Various proposals have heretofore been made for sensing the quantity of tape in the storage containers such as by weighing the quantity of tape therein or by the use of pneumatic valves which are actuated when the tape in the bin reaches a predetermined level. The object of the present invention is to provide an improved apparatus for sensing the quantity of an elongated medium.

According to one feature of the invention there is provided apparatus for sensing the quantity of an elongated medium in a storage container, said container comprising a pair of electrodes disposed face to face to form an electrical condenser and to provide a space therebetween for accommodating a quantity of an elongated medium, and means for measuring the electrical capacity between said electrodes to determine the quantity of said medium in said space.

Said electrodes may be constituted by, or be disposed adjacent to or be attached to, facing sides of a storage container or bin, so that when the elongated medium is fed into the container the electrical capacity between said electrodes will be varied. The medium will in general be of electrically insulating material and when the container is empty the dielectric medium will be air but when such insulating material is within the container, so that some of the air is replaced by the medium, the dielectric constant will be different since the dielectric constant of the medium is different from that of air. Where the medium is magnetisable tape which comprises an insulating supporting film with a coating of a magnetisable material such as a magnetic iron oxide thereon, the presence of the magnetic iron oxide between the aforesaid plates will also serve to effect a variation in electrical capacity. Thus it may be found that the variation in electrical capacity when employing magnetisable tape of the above form is several times as great as when a similar film is employed without a magnetic coating. In any case variation of the quantity of medium in the container will cause a variation in capacitance and such variation can be measured by any suitable means such as a capacity bridge. Dependent on the variation in the capacitance as the medium is fed to or withdrawn from the container so the measured change in capacitance can be employed to actuate mechanism for controlling the withdrawal of or supply of the magnetisable tape or other elongated medium from or to the container.

Figure 2:
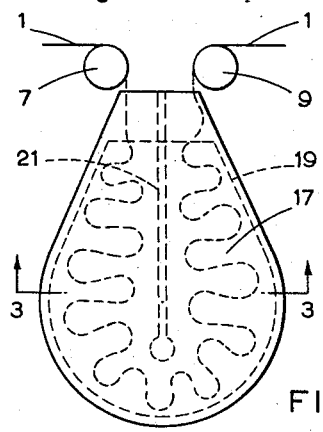
Figure 3:
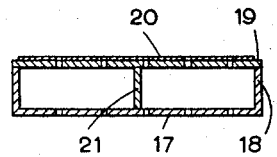
Figure 4:
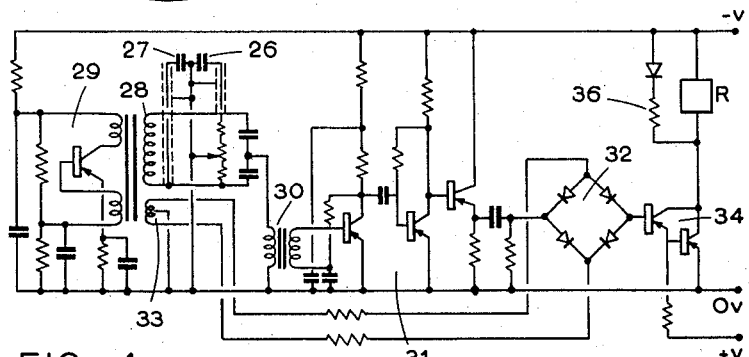

In order that the said invention may be clearly understood and readily carried into effect, it will now be more fully described with reference to the accompanying drawings, in which:

FIGURE 1 is a schematic view which diagrammatically represents the invention as applied to magnetic tape transducing apparatus, FIGURE 2 is an elevation of a storage container in accordance with one embodiment of the invention, FIGURE 3 is a cross-sectional view taken along the line 3—3 of FIGURE 1, and FIGURE 4 is a circuit diagram illustrating a suitable form of measuring bridge which can be used in the embodiment shown in FIGURES 1, 2 and 3.

The invention is particularly applicable to magnetic transducing apparatus such as magnetic data storage apparatus in which the elongated medium, the quantity of which is to be sensed, is in the form of magnetisable tape which may for example be 1" wide, such tape as is well known usually comprising an insulating film made of a material such as a cellulose acetate, polyvinyl chloride or polyester resin having a coating of magnetic iron oxide. Such a tape may be required to be driven past magnetic transducing heads at a speed of about 200" per second.

FIGURE 1 of the drawings illustrates diagrammatically magnetic transducing apparatus such as may be employed in magnetic data storage apparatus. In this figure the magnetisable tape is indicated at 1 and the ends thereof are wound upon spools 2 and 3 which can be driven in either direction by means of electric motors 4 and 5. Tape from the spool 2 passes over a guide roller 6, over a vacuum capstan roller 7 into a storage container or bin 8, then over a further capstan roller 9 and over a supporting surface 10 where it moves in proximity to one or more transducing heads 11. The tape then passes over a further capstan roller 12 and into a further storage container or bin 13, then over a further capstan roller 14 and guide roller 15 and onto the spool 3. During operation of such apparatus it is required to maintain a predetermined quantity of tape in the bins 8 and 13. Thus when the tape 1 in one of the containers or bins 8 or 13 exceeds a predetermined quantity the tape is withdrawn from the container or bin and wound upon a spool, and when the tape in one of the containers reaches a predetermined minimum, tape from one of the spools is fed thereto to replenish the supply. The direction in which the tape is moved, that is to say either from right to left in FIGURE 1 or left to right, is determined by command signals which may be derived manually or from a computer, and in the embodiment shown in FIGURE 1 a source of command signals indicated at 16 is provided which as shown is coupled to the motors 4 and 5 so that the direction in which these motors rotate when energised is controlled in accordance with the direction in which the tape is required to be moved. Thus when the tape is required to be moved from left to right in FIGURE 1, then the motor 4, when energised, will rotate the spool 2 to unwind tape therefrom, and the motor 5 will, when energized, rotate the spool 3 to wind tape thereon. Likewise when the tape is required to be driven from right to left the motors 4 and 5 when energised, will rotate the spools 2 and 3 respectively in the reverse directions. The capstan rollers 7 and 14 have suction applied thereto continuously, and these rollers are continuously rotated in directions so as to tend to feed tape into their associated containers 8 and 13 respectively. Motors coupled to the capstan rollers 9 and 12 are energised so as to rotate the rollers 9 and 12 in opposite directions, and to drive the tape past the heads 11 in a required direction one or other of the rollers 9 and 12 has suction applied thereto. If the tape is driven from left to right by the roller 12 then tape will be withdrawn from the container 8 and fed into the container 13 and when the quantity of tape in the container 8 falls below a predetermined minimum the motor 4 is energised so as to rotate the spool 2 in a direction to enable the capstan roller 7 to feed tape from the spool 2 into the container 8. Likewise when the tape in the container 13 exceeds a predetermined minimum the motor 5 will be energised so as to rotate the spool 3 in a direction to wind tape thereon and remove it from the container 13. The reverse operations occur when the tape is being driven from right to left by the roller 9. The energisation of the motors 4 and 5 is determined in accordance with the measured quantity of the tape in the bins 8 and 13, and in the embodiment shown the quantity of tape is sensed as a result of a change in capacitive reactance. For this purpose each of the storage containers or bins 8 and 13 shown in FIGURE 1 is constructed so as to comprise in effect an electrical condenser. The front and back of each storage container may comprise metallic material and the front and back are insulated from one another, so that the front and back of the storage container constitute the plate electrodes of an electrical condenser, the dielectric medium between the electrodes when the container is empty being air. The tape has a different dielectric constant from that of air so that when tape is fed into the container and some of the air therein is replaced by the tape, the dielectric constant will be changed and hence the capacitance between the electrodes formed by the front and back of the container will be varied. As mentioned above the presence of the magnetisable coating on the tape affects the extent of the change of capacitance depending on the quantity of tape fed into the container. The capacitance between the plate electrode constituted by the front and back of the container will thus vary depending on the quantity of tape within the container. This change in capacitance can be measured in any suitable manner and detected changes can be employed to control the motors 4 and 5 which rotate the spools 2 and 3 so as to adjust the supply of tape in the containers according to requirements.

A particular construction of storage container is shown in FIGURES 2 and 3 in which the front of the container indicated at 17 is formed as a part of the so-called tape deck so that it is effectively earthed and is formed integrally with the side 18 and bottom of the container. The rear wall of the container is formed by a sheet of insulating material 19 having on its outer surface a thin sheet of conducting material 20 such as copper, which in conjunction with the front of the container constitute the plate electrodes of a condenser. The sheet 19 may be formed of laminations of insulating material impregnated with Bakelite (registered trademark) to the outer surface of which a thin copper sheet is caused to adhere. The bottom of the container is preferably of the arcuate form shown in FIGURE 2 and the general shape of the container is preferably as indicated so that the tape, when fed into the container, forms a series of folds or loops therein as indicated. A central partition 21 of insulating material may be employed so as to prevent interleaving of the folds or loops of the tape as the tape is fed into or withdrawn from the container from either side of the partition 8. The front and back walls of the container are preferably perforated as shown in FIGURE 3 so as to enable any air which may be trapped between the folds or loops of the tape to escape through the perforations. Since as aforesaid the front of the container is earthed, screening from hand capacity is effectively provided.

In one particular example of the invention the capacitance of an empty container is of the order of 100 pf. whilst the change in capacity, when 50 ft. of magnetisable tape is fed into the container, is of the order of 4 pf. The changes in capacitance are measured in any suitable manner such as by capacitance measuring bridges indicated at 22 and 23 in FIGURE 1, and the outputs of the bridges control the actuation of relays 24 and 25 which, in turn, control the energisation of the motors 4 and 5 respectively so as to cause the spools 2 and 3 to rotate as required to withdraw tape from, or to feed tape to the respective containers or bins. Thus when the quantity of tape in one of the containers or bins 8 and 13 increases beyond a predetermined level, the consequent increase in capacitance as measured by one of the bridges 22 and 23 results in actuation of the associated relays 24 or 25 so as to energise the associated motor 4 or 5 to rotate the spool 2 or 3 in a direction to withdraw tape from that container or bin. Similarly, when the quantity of tape in one of the containers or bins 8 and 13 falls below a predetermined level, the consequent decrease in the measured capacitance, and the resulting actuation of the associated relay 24 or 25 effects energisation of the associated motor 4 or 5 to rotate the spool 2 or 3 in a direction to supply more tape to that container or bin.

A typical example of a bridge suitable for measuring the capacity between the electrodes of a container or bin is shown in FIGURE 4. In this figure the capacitance of one of the containers is indicated at 26 and forms one arm of the bridge, whilst a condenser 27 of similar value to the capacitance of the bin when empty forms another arm of the bridge. The bridge may be arranged to be balanced when the container is half full of tape and departure of the bridge in either direction from the balanced condition may be arranged to cause the feeding of tape to the container or withdrawal of tape therefrom depending on the sense of unbalance. As will be observed from FIGURE 4 the bridge is an inductively coupled ratio arm bridge which is quite well known for measuring small capacities. The bridge includes an inductance 28 which is fed with oscillations of a suitable frequency from a transistor oscillator indicated at 29. An output from the bridge is obtained when a condition of unbalance exists and this output is fed via a transformer 30 to a transistor amplifier 31 and thence to a phase-sensitive rectifier 32 which is also fed with oscillations from the oscillator 29 via a transformer 33, the output from the rectifier 32 being fed to a D.C. power transistor amplifier 34 which is connected to a relay R which is biassed from a biassing circuit 36 so that the relay is changed from one condition to another only when the output of the bridge changes from one predetermined value to another.

Assuming that command signals have been given so as to cause the tape to be driven from left to right in FIGURE 1 and that the containers 8 and 13 each have a predetermined quantity of tape therein, then the motors 4 and 5 will not be energised. Tape will be withdrawn from the container 8 and when the quantity of tape therein falls below a predetermined level the relay 24, which corresponds to the relay R in FIGURE 4, will be actuated so as to energise the motor 4 to drive the spool 2 in an unwinding direction so as to feed more tape into the container 8, it being appreciated that the motor 4 is preconditioned by the command signals to drive the spool 2 in this direction. So long as tape is being withdrawn from the container 8 and the quantity of tape therein is below the predetermined level, tape will be supplied to the container 8 from the spool 2. As the tape moves from left to right, tape will be fed into the container 13 and when the quantity of tape therein increases beyond a predetermined level, then the relay 25 will be actuated so as to energise the motor 5 which drives the spool 3 in a winding-up direction so as to withdraw tape from the container 13, it again being appreciated that the motor 5 is pre-conditioned by the command signals to drive the spool 3 in a winding-up direction as soon as the relay 25 is actuated. The manner in which the apparatus shown in FIGURE 1 operates when the tape is being driven from right to left will be readily appreciated.

What we claim is:
1. Apparatus for conveying an elongated flexible medium, comprising a storage container, first drive means for feeding said medium into said container, and second drive means for removing said medium from said container, said container comprising a pair of conductive members disposed face to face and electrically insulated one from the other providing a substantially constant space therebetween for accommodating a quantity of said medium wherein the variation in the quantity of elongated medium accommodated in said space causes a change in the capacity between said plates dependent upon the length of said medium accommodated in said space, means for deriving a control signal which varies depending on variations in the capacity between said plates produced by the medium accommodated therebetween, means responsive to said signal for selectively rendering one of said drive means operative and inoperative so as to tend to keep said capacity to a predetermined substantially constant value, and means for operating said other drive means independently of said control signal.

2. Apparatus according to claim 1, wherein said means for deriving a control signal includes a capacity measuring bridge, and the means responsive to said signal comprises a relay which is adapted to be actuated when the capacity varies from a predetermined value.

3. Apparatus for conveying an elongated flexible medium, comprising a storage container, first drive means for feeding said medium into said container, and second drive means for removing said medium from said container, said container comprising a pair of conductive members disposed face to face and electrically insulated one from the other providing a substantially constant space therebetween for accommodating a quantity of said medium wherein the variation in the quantity of elongated medium accommodated in said space causes a change in the capacity between said plates dependent upon the length of said medium accommodated in said space, means for deriving a control signal which varies depending on variations in the capacity between said plates produced by the medium accommodated therebetween, means responsive to said signal for selectively rendering said first drive means operative and inoperative so as to tend to keep said capacity to a predetermined substantially constant value, and means for operating said second drive means independently of said control signal.

4. Apparatus according to claim 3, wherein said means for deriving a control signal includes a capacity measuring bridge, and the means responsive to said signal comprises a relay which is adapted to be actuated when the capacity varies from a predetermined value.

5. Magnetic tape transducing apparatus comprising a storage container, first drive means for feeding magnetic tape into said container, and second drive means for removing said magnetic tape from said container, said container comprising a pair of conductive members disposed face to face and electrically insulated one from the other providing a substantially constant space therebetween for accommodating a quantity of said magnetic tape wherein the variation in the quantity of magnetic tape accommodated in said space causes a change in the capacity between said plates dependent upon the length of said magnetic tape accommodated in said space, means for deriving a control signal which varies depending on variations in the capacity between said plates produced by the magnetic tape accommodated therebetween, means responsive to said signal for selectively rendering one of said drive means operative and inoperative so as to tend to keep said capacity to a predetermined substantially constant value, and means for operating said other drive means independently of said control signal.

6. Apparatus according to claim 5, wherein said means for deriving a control signal includes a capacity measuring bridge, and the means responsive to said signal comprises a relay which is adapted to be actuated when the capacity varies from a predetermined value.

References Cited in the file of this patent

UNITED STATES PATENTS

| | | |
|---|---|---|
| 1,708,074 | Allen | Apr. 9, 1929 |
| 2,146,869 | White | Feb. 14, 1939 |
| 2,200,863 | Schuck | May 14, 1940 |
| 2,514,847 | Coroniti et al. | July 11, 1950 |
| 2,516,768 | Grob et al. | July 25, 1950 |
| 2,535,026 | Anderson | Dec. 26, 1950 |
| 2,730,309 | Baer | Jan. 10, 1956 |
| 2,778,634 | Gams et al. | Jan. 22, 1957 |
| 2,831,678 | MacNeill | Apr. 22, 1958 |

FOREIGN PATENTS

| | | |
|---|---|---|
| 1,049,109 | Germany | Jan. 22, 1959 |